United States Patent [19]

Nakashima et al.

[11] Patent Number: 4,745,316
[45] Date of Patent: May 17, 1988

[54] SUBMERSIBLE MOTOR

[75] Inventors: Ryoichi Nakashima, Funabashi; Yasuro Suzuki, Narashino; Masato Kobayashi, Chiba, all of Japan

[73] Assignee: Hitachi, Ltd., Tokyo, Japan

[21] Appl. No.: 854,030

[22] Filed: Apr. 21, 1986

[30] Foreign Application Priority Data

Apr. 19, 1985 [JP] Japan .................................. 60-82685

[51] Int. Cl.[4] ............................................. H02K 5/10
[52] U.S. Cl. .................................................... 310/87
[58] Field of Search ........................................... 310/87

[56] References Cited

U.S. PATENT DOCUMENTS 2,703,371  3/1955  Wightman ............................ 310/87
2,786,952  3/1957  Plueuger .............................. 310/87

Primary Examiner—Donovan F. Duggan
Attorney, Agent, or Firm—Antonelli, Terry & Wands

[57] ABSTRACT

In a submersible motor, a liquid is filled into its rotor chamber, a shaft to which a rotor is fixed is supported on a frame by sleeve bearings, and a diaphragm for controlling the pressure within the rotor chamber is disposed at the lower portion of the frame. Chambers communicating with the rotor chamber, are disposed above an upper sleeve bearing and the chambers accomodate a reserve liquid having a volume larger than that of the diaphragm. Therefor, even if the pressure within the rotor chamber rises and the diaphragm is deformed, the upper sleeve bearing is continuously filled with the liquid, thereby enabling continuous lubrication and cooling.

3 Claims, 2 Drawing Sheets

SUBMERSIBLE MOTOR

BACKGROUND OF THE INVENTION

Field of the Invention

The present invention relates to an electric motor and more particularly, to a submersible electric motor of a type in which a liquid such as water is hermetically confined in the interior thereof.

There are certain submersible electric motors of known types in which a liquid is contained within the interior in a hermetically sealed manner so as to improve lubrication and cooling of bearings. Typical submersible motors are disclosed in, for example U.S. Pat. No. 3,050,645, Japanese Patent Laid-Open No. 9607/1974 and Japanese Patent Laid-Open No. 72611/1973. In these known types, a shaft projects from the top of the frame thereof and a diaphragm, acting as a pressure-control member, is disposed at the lower portion of the frame. The diaphragm includes an elastic member and, as pressure within the submersible motor increases, the diaphragm is deformed so as to increase the volume of the interior of the motor.

Generally, a variation in a diaphragm volume is determined in terms of the expansion of the liquid contained in a motor since the liquid contained in a motor expands as the temperature rises. The shaft is also rotatably supported on the frame by an upper sleeve bearing and a lower sleeve bearing, with the upper and lower sleeve bearings being lubricated and cooled with a liquid contained in the motor. Thus, it is critical that the upper sleeve bearing and the lower sleeve bearing be continuously submerged in the liquid. A common method of charging a liquid into the interior of a submersible motor is to drill a hole in the top of the frame for charging the liquid therethrough. While this type of submersible motor is operating, the upper sleeve bearing is heated, thus causing, for example, a problem of breakage. Various experiments have been conducted to determine the causes of this problem as described below.

More particularly, an interior of the submersible motor is not completely filled with the liquid since air remains in the lower portion of its rotor and the recesses of the frame. The residual air travels upwardly due to centrifugal force or vibration caused by the operation of the submersible motor. Accordingly, the air reaches the top and the upper sleeve bearing which has first to be submerged in the contained liquid is thus exposed above the liquid level, thereby making it impossible to carry out proper lubrication and cooling.

In a case where water is used as the contained liquid, the shaft and the rotor of the submersible motor come into contact with the water and are oxidized, thus generating hydrogen gas. The hydrogen gas comes to the upper portion of the submersible motor similar to the air. The quantity of hydrogen gas generated increases with the passage of time during storage or operation of the submersible motor. The hydrogen gas raises the pressure within the submersible motor and simultaneously deforms the diaphragm. When the diaphragm is deformed, the volume of the interior of the submersible motor is increased in proportion to the amount of deformation, and the liquid level in the submersible motor is lowered. Consequently, since the liquid level falls, the upper sleeve bearing is exposed above the liquid surface, thereby resulting in insufficient lubrication and cooling.

SUMMARY OF THE INVENTION

The present invention has been devised in the light of the above described problems, and it is an object of this invention to provide a submersible motor in which an upper sleeve bearing thereof can be continuously and positively lubricated and cooled even if a diaphragm becomes deformed.

It is another object of this invention to provide a submersible motor in which a liquid contained in the interior thereof can be further cooled.

It is yet another object of this invention to provide a submersible motor in which the volume of the diaphragm can be reduced.

Further objects, features and advantages of the present invention will become apparent from the following description.

A submersible motor in accordance with the present invention includes chambers above the upper sleeve bearing thereof with each of the chambers including a reserve sealing liquid. The power portion of the submersible motor is provided with a diaphragm for controlling rises in internal pressure, and the volume of the reserve sealing liquid is greater than that of the diaphragm. Therefore, if the pressure rises in the interior of the submersible motor and the diaphragm is deformed, the upper sleeve bearing can be lubricated and cooled since the reserve sealing liquid is supplied at that time.

In accordance with one preferred embodiment of the present invention, the cross-section of the respective foregoing chambers has a rectangular shape which extends from the shaft to the outer periphery. The chambers which are constructed in this fashion enable the effecient cooling of the reserve sealing liquid contained in them. Specifically, since the outer periphery of the frame surrounding the chambers is positioned underwater, the reserve sealing water within the chamber is efficiently cooled by the water around the the frame.

In accordance with yet further features of the present invention, the interior of the respective chambers accommodates both reserve sealing water and air. While the submersible motor is operating, the temperature thereof rises and the internal liquid is expanded. The expansion of the liquid compresses the compressible air within the chambers, and therefore, the rise in internal pressure caused by the liquid expansion is reduced thereby enabling a manufacturing of a small-size diaphragm.

DETAILED DESCRIPTION

Figure 1:
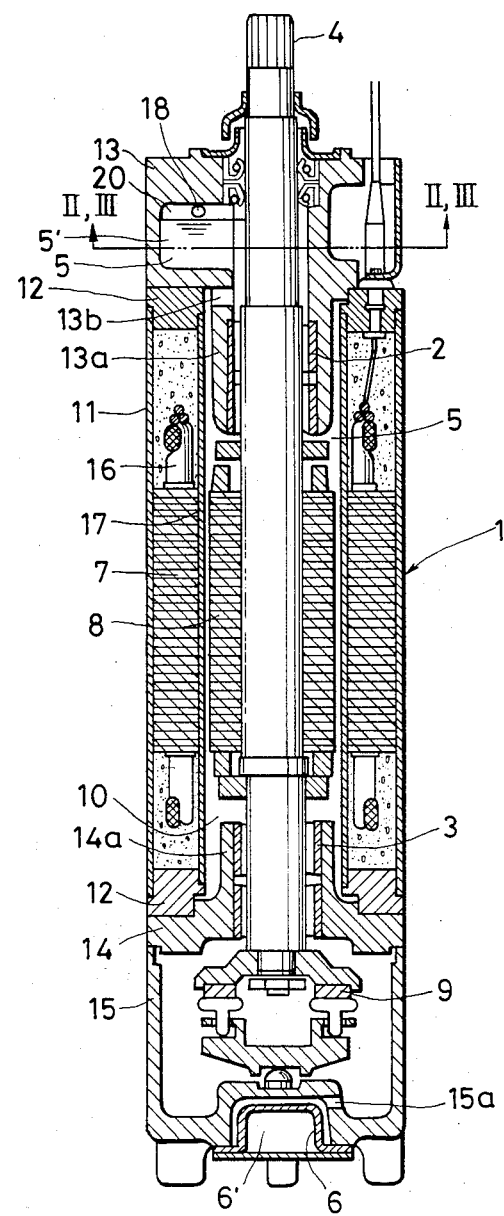
FIG. 1 is a longitudinal cross-sectional view of a submersible motor in accordance with the present invention.

Referring now to the drawings when like reference numerals are used throughout the various views to designate like parts and, more particularly, to FIGS. 1 and 2, according to these figures, submersible motor generally designated by the reference numeral 1 has a stator 7 and a rotor 8 in a frame 11 thereof, with the stator 7 being fixed to an inner periphery of the frame 11, and an interior thereof covered with a container or a can 17. The rotor 8 is fixed to a shaft 4 and is located inside the stator 7 with a gap therebetween, with the shaft 4 being pivotally supported on an upper end bracket 13 and a lower end bracket 14 through an upper sleeve bearing 2 and a lower sleeve bearing 3. The upper end of the shaft 4 passes through the center of the upper end bracket 13 and projects upwardly. An impeller of a pump (not shown) is coupled to the upper end of the shaft 4. The lower end of the shaft 4 passes through the center of the lower end bracket 14 and extends downwardly. The lower portion of the lower end bracket 14 has a cover 15 which covers the lower end portion of the shaft 4, with the cover 15 being provided with a diaphragm 6 for controlling any pressure rise in the submersible motor 1. The cover 15 is a hole 15a for enabling communication between the rotor chamber 5 and the diaphragm 6. A thrust bearing 9 is disposed in the cover 15, With the thrust bearing 9 transmitting a thrust load generated by the rotation of the impeller and the weights of the shaft 4 and the rotor 8 to the cover 15. The chambers 20 are disposed above the upper sleeve bearing 2, with the interior of each of the chambers 20 accommodating a reserve sealing water 5'. A liquid 5 is contained in a sealed manner within a rotor chamber 10, and the rotor chamber 10, the chambers 20 and the interior of the cover 15 are communicated with one another through a hole 13b and a groove formed on the lower sleeve bearing 3. The upper portion of the respective chambers 20 has a liquid pouring hole 18, with the liquid pouring hole 18 being normally closed by a plug.

Upon a starting operation of the submersible motor 1, the rotor 8 starts to rotate and liquid 5 begins to turn at the same time, with the air remaining in the lower portion of the rotor 8 and the recesses of the frame and the thrust bearing 9 coming to the surface due to the rotation of the liquid 5. Although hydrogen gas is produced by the corrosion of the rotor 8 and the shaft 4, it also comes up to the upper portion similar to the air. When the air and the hydrogen gas enter into the chambers 20, the liquid level in the chambers 20 is lowered. However, the liquid level in the upper sleeve bearing 2 is supplemented with the reserve sealing water 5'.

When the temperature rises, the pressure within the submersible motor 1 increases, thereby causing the diaphragm 6 to be deformed. The liquid level within the chambers 20 is lowered in accordance with the deformation of the diaphragm 6. In this case as well, the liquid level in the upper sleeve bearing 2 is supplemented with the reserve sealing water 5'. The volume of the reserve sealing water within the chambers 20 is larger than a changeable volume 6' of the deformable diaphragm 6. Therefore, even if the diaphragm 6 is deformed, the upper sleeve bearing 2 is continuously submerged in the liquid, thereby providing proper lubrication and cooling.

Figure 2:
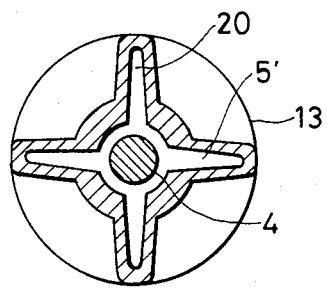
FIG. 2 is a cross-sectional view of the submersible motor, taken along the line II—II of FIG. 1.
Figure 3:
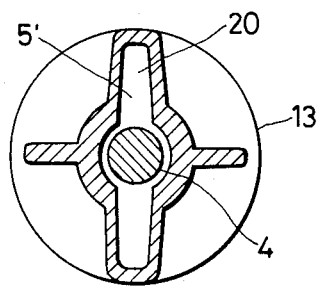
FIG. 3 is a cross-sectional view of a modification of FIG. 2.

Preferably, as shown most clearly in FIG. 2, each of the chambers 20 in has a rectangular shape which extends from the shaft 4 to the outer periphery. A plurality of chambers 20 are communicated with one another around the shaft 4. The reserve sealing water 5' within the chambers 20 is efficiently cooled by this construction. Specifically, the inner side walls of the plurality of rectangular chambers 20 have large areas which are maintained in contant with the reserve sealing water 5'. In other words, the heat transfer rate from the reserve sealing water 5' to the upper end bracket 13 is large. The liquid 5 within the rotor chamber 10 is heated by the stator 7, the rotor 8, the upper sleeve bearing 2 and the lower sleeve bearing 3. The liquid 5 thus heated is expanded and its specific gravity becomes small, so that it comes to the upper portion. The reserve sealing water 5' within the chamber 20 which is communicated with the rotor chamber 10 rises in temperature. However, the reserve sealing water 5' is cooled through the upper end bracket 13 by the water around the submersible motor 1. Accordingly, the stator 7, the rotor 8 and the sleeve bearings 2, 3 are further efficiently cooled.

In general, the reserve sealing water 5' is turned concurrently with the rotation of the shaft 4. Particularly, when air or hydrogen gas is held in the chambers 20, the reserve sealing water 5' is rotated, thereby lowering the liquid level around the center of the shaft 4. The upper sleeve bearing 2 is exposed above the liquid level since the liquid level falls. The plurality of rectangular chambers 20 are capable of controlling not only the rotation of the reserve sealing water 5' but also unwanted lowering in the liquid level involved with the rotation.

Figure 4:
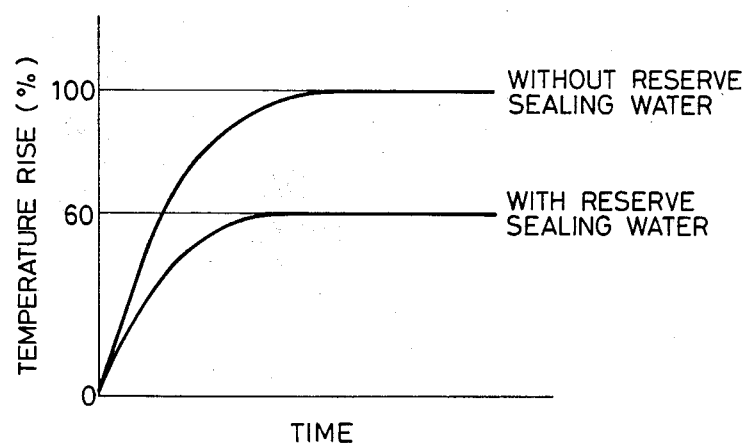
FIG. 4 is a graphical illustration comparing the temperature rises of the upper sleeve bearing which occur in the presence of a reserve sealing water and in the absence of such water.

According to the present invention, the reserve sealing water 5' and air may be hermetically filled in a sealed manner in the chambers 20. When the temperature of the submersible motor 1 rises, the liquid 5 expands to thereby compress the air. When the pressure is doubled, the volume of air is reduced to ½. On the other hand, there is a letter variation in the volume of the liquid 5 even if the pressure increases. For this reason, when the rotor chamber 10 and the chambers 20 contain no air, the expansion of the liquid 5 provides a remarkably large pressure. If the liquid 5 expands in excess of the volume 6' of the diaphragm 6, the frame may be broken. Additionally, after the liquid 5 has been filled into the rotor chamber 10 and the chambers 20, a certain amount of air remains therein. However, there are two cases where the amount of the residual air is large and it is small. If the amount of the residual air is small, the pressure generated by the expansion of the liquid 5 is not sufficiently absorbed by the air. In order to solve this problem, when the liquid 5 is to be charged, the reserve sealing water 5' and air are filled into the chambers 20 by a predetermined amount, respectively. This construction enables the expansion of the liquid 5 due to temperature rises to be positively absorbed by the air. Accordingly, even if the volume 6' of the diaphragm 6 is smaller than the total volume obtained from the expansion of the liquid 5 and the reserve sealing water 5', the breakage of the frame 11 can be prevented. When the total volume of the expansion of the liquids 5 and 5' are constant, the volume 6' of the diaphragm 6 can be reduced. Since, in accordance with the present invention, the chambers 20 are disposed above the upper sleeve bearing 2 of the submersible motor 1 and the reserve sealing water 5' is accommodated by the chambers 20, the upper sleeve bearing 2 is continuously lubricated and cooled. FIG. 4 is a graph comparing the temperature rises of the upper sleeve bearing 2 of the submersible motor of this invention and that of the prior art. As shown in FIG. 4, it has been experimentally determined that the submersible motor of this invention succeeds in reducing the temperature rise by 40% as compared with the prior-art submersible motor.

While this invention has been described in conjunction with a specific embodiments thereof, it is evident that many alternatives, modifications and variations will be apparent to those skilled in the art. For example, in addition to water, oil may be employed as the liquid 5 and the reserve sealing liquid 5'. The thrust bearing 9 may be disposed above the lower end bracket 14 and a bearing without any cover may be employed. Moreover, each of the inner walls of the outer diameter of the chambers 20 may have not only a rectangular shape but also a curved one.

Accordingly, all such alternatives, modifications and variations as fall within the spirit and scope of the present invention are embraced in the appended claims.

What is claimed is:

1. A submersible motor comprising: a stator fixed to an inner peripheral portion of a frame; a rotor disposed inside said stator and fixed to a shaft; an upper sleeve bearing means and a lower sleeve bearing means for rotatably supporting said shaft on said frame; a liquid hermetically contained in a sealed manner within a rotor chamber surrounding said rotor; a diaphragm having a prdetermined volume enclosed thereby and disposed beneath said frame; means for communicating said rotor chamber with said diaphragm; and chamber means communicating with said rotor chamber disposed above said upper sleeve bearing means; and being filled with air and reserve sealing fluid, wherein said chamber means comprises a plurality of rectangular chambers in communication with one another around said shaft, and the volume of said chamber means is larger than said predetermined volume of said diaphragm.

2. A submersible motor according to claim 1, wherein said chamber means include a plurality of individual chambers having a rectangular shape respectively extending from said shaft to said outer diameter, and said plurality of chambers are in communication with one another around said shaft.

3. A submersible motor according to claim 1, wherein said liquid and reserve liquid are water.

* * * * *